United States Patent [19]
Stolzer

[11] 3,960,280
[45] June 1, 1976

[54] STORAGE SYSTEM
[75] Inventor: Paul Stolzer, Achern, Germany
[73] Assignee: Keuro Maschinenbau Gesellschaft mit beschrankter Haftung & Co. Kommanditgesellschaft, Achern, Germany
[22] Filed: Mar. 17, 1975
[21] Appl. No.: 559,022

[30] Foreign Application Priority Data
Mar. 15, 1974 Germany............................ 2412380

[52] U.S. Cl. .............................. 214/8.5 A; 53/163; 83/417; 214/8.5 F; 214/310
[51] Int. Cl.² ......................................... B65G 59/00
[58] Field of Search ................ 214/6 P, 6 H, 8.5 A, 214/8.5 F, 8.5 G, 309, 310, 95 R; 53/163, 245; 83/417

[56] References Cited
UNITED STATES PATENTS

| | | | |
|---|---|---|---|
| 2,900,095 | 8/1959 | Sack.................................. | 214/95 R |
| 3,426,922 | 2/1969 | Massey ............................. | 214/310 |
| 3,765,150 | 10/1973 | Gilev et al. ......................... | 53/245 |
| 3,810,404 | 5/1974 | Stolzer................................. | 83/417 |
| 3,904,053 | 9/1975 | Yatagai et al........................ | 214/310 |

*Primary Examiner*—Frank E. Werner
*Assistant Examiner*—Ross Weaver
*Attorney, Agent, or Firm*—Spencer & Kaye

[57] ABSTRACT

A storage systems for storing and retrieving rod-shaped material, includes a plurality of pallets for accommodating the material, each pallet has a material-supporting bottom inclined transversely to the length dimension of the pallet; a device for storing the pallets; a withdrawal apparatus for retrieving a selected one of the pallets from the storing device; a positioning device in the withdrawal apparatus for adjusting the longitudinal and transverse position of the pallet and for lifting the pallet against stops in the withdrawal apparatus; an apparatus for lifting the material out of, and lowering it into a pallet disposed in the withdrawal apparatus. The apparatus has at least two lifters arranged serially with respect to the length of the pallet disposed in the withdrawal apparatus. The lifters are moved in unison vertically through apertures provided in the bottom of the pallet for engaging and moving the material with respect to the pallet. There are further provided abutments projecting from a side of the pallet inwardly thereof for cooperating with the lifters to arrest their upward motion when the lifted material has reached, above the pallet, a predetermined position from which it is displaceable transversely to the length of the pallet onto a conveyor leading to a cutting machine. At the upper end of each lifter there is attached a rocker cooperating with an associated abutment and arranged for a swinging motion about an axis extending parallel to the length of the pallet disposed in the withdrawal apparatus. The axis is situated eccentrically with respect to the width of the pallet, in the direction of the higher-lying side of the pallet bottom.

7 Claims, 6 Drawing Figures

STORAGE SYSTEM

BACKGROUND OF THE INVENTION

This invention relates to an apparatus for lifting and lowering rod-like material from and, respectively, back into a storage pallet in conjunction with an apparatus for the automatic supply of a cutting machine with the rod-like material. The pallet is, in a removal or withdrawal station, adjustable in its longitudinal and transversal orientation and can be lifted against abutments. The lifting and lowering of the rod-like material from and, respectively, into the pallet is effected by means of at least two lifters which are arranged serially with respect to the length dimension of the pallet and which are movable vertically in unison through openings in the bottom of the pallet. The motion of the lifters may be arrested by at least one cooperating abutment protruding from the longitudinal sides into the inner cross section of the pallet when the rod-like material has arrived in a position from which it may be shifted, in a direction transversal to the pallet, onto a conveyor which then advances the material to a cutting machine.

A system of the above-outlined type is disclosed in U.S. Pat. No. 3,810,404, issued May 14th, 1974. In the system disclosed in this patent the pallets containing the rod-like material are disposed on shelving units which are in alignment in a direction transversal to the length dimension of the pallets. From the shelving unit the pallets are brought with the aid of a transporting gantry over the shelving unit to the apparatus for lifting out and again depositing the rod-like material. This apparatus is designated hereinafter as removing or withdrawal apparatus. Upon bringing a pallet into the withdrawal apparatus, the lifters are operational until the material or, as the case may be, the upper material layer in the pallet, is lifted out beyond the edge of the pallet. Thereafter, the motion of the lifter is interrupted or limited by means of at least one stop member against which abut the lifters or, as the case may be, plate members disposed between the layers of the rod-like material. Thereafter, the rod-like material may be individually pushed in a lateral direction by means of a pushing device onto a conveyor and advanced by the latter to the cutting machine. After the cutting machine has severed the desired number of pieces of the material being worked on, the material remnant, provided its further storage is worthwhile, is brought back by the conveyor into the withdrawal station and there it is again pushed over the pallet. Thereafter, the lifters lower this material into the pallet so that the latter may be sent back to its location of storage.

It is expedient and desirable to use, in the above-outlined system, pallets of identical design. In this connection, however, the problem is encountered that the inner cross section of the pallet when measured in a direction normal to its length dimension is, in a multiple manner, not adapted to the cross section of the material stored therein to ensure that the material is disposed without significant lateral play. This applies also when, of a material layer which, for example, consists of five rods, only a portion, for example, two rods, is used. In case a pallet loaded in this manner is moved by the gantry-like transporting apparatus, the material may shift or roll therein back and forth. Thus, there is a danger of damaging the pallets and furthermore, the possibility is not excluded that the rod-like material shifts over a material layer with a likely result that in case of significant accelerations of the transporting device the material may drop out of the pallet.

Although this drawback can conceivably be eliminated by "padding" the inside of the pallets with a filler material to limit the cross section to that of the material to be stored therein, this measure is circumstantial and is of no use if a material layer is no longer complete.

SUMMARY OF THE INVENTION

It is an object of the invention to provide an improved system of the above-outlined type to ensure that the material in the pallets always assumes a defined position which resists the accelerations imparted by the gantry-like transporting apparatus on the pallets transversely to their longitudinal dimensions.

It is a further object to provide simple, inexpensive and operationally safe measures to accomplish the above purpose.

These objects and others to become apparent as the specification progresses, are accomplished by the invention, according to which, briefly stated, based on a known system outlined above, the bottom of the pallet serving to support the material is inclined in a direction transversal to the length dimension of the pallet. Further, the lifters carry at their upper end a rocker which is swingable about an axis extending in the length dimension of the pallet. Further, the pivotal axes of the rockers are, in the transversal direction of the pallet, located eccentrically and toward the higher end of the pallet bottom and also, for each lifter there is provided a path-limiting abutment on both longitudinal sides of the pallet. The height position of these abutments is identical.

By means of the above-outlined measures according to the invention it is ensured that the material, independently of whether a material layer is complete or not, always lies against one lateral side of the pallet. By means of the angle of inclination of the pallet bottom it can be easily ensured that the material remains undisturbed in case of accelerations by the transporting apparatus.

The above also applies to the operation of the lifters since their rocker is articulated in such a manner that it sets itself at an inclination identical to that of the pallet bottom.

At the end of the lifting operation, however, it has to be ensured that the material will be in a horizontal arrangement in order to transfer the material onto the conveyor without difficulties and without the danger of a shifting of material on top of one another. This is accomplished by providing an abutment on each side of the pallet for limiting the motion of the lifters. The abutments are positioned at identical height. This arrangement has the effect that during the lifting motion of the lifters, first those abutments become effective which are arranged at the higher side of the rocker. These abutments then prevent a lifting motion at that side, so that the lifting motion is transformed into a tilting motion at the rocker and thus at the material, until the abutment situated at the other side of the pallet also becomes effective to entirely stop the lifting motion. During this occurrence the material is pivoted in such a manner that its layers will assume a horizontal end position. If the material is to be redeposited into the pallets, the above-described tilting motion is executed in a reverse direction. It has been found to be advantageous to provide the rockers with cutouts which fit the vertical cross section of the cooperating portions of the above-described abutments. This arrangement is effected in such a manner that upon stoppage of the lifting motion, their horizontal upper edge is aligned with the horizontal upper edge of the abutments. In this manner it is ensured that the material layer, at the end of the lifting motion, is in a height position which permits to shift the material laterally onto the conveyor without the necessity of overcoming any obstruction.

In order to ensure also at the rockers a limitation of the maximum inclined position or, as the case may be, to adapt the inclined position of the rockers to that of the pallet bottom, it is expedient to limit the inclined position of the rockers by an abutment affixed to the associated lifter.

In case there are several layers of the rod-like material in a pallet, it has to be ensured that the layers can be lifted out of the pallet consecutively. In order to make this possible, it was found to be expedient to provide that the abutments are swingable in unison from a zone which corresponds to its inner cross section and which is situated above the pallet. Such pivotal motion of the abutments is thus effected when the material of one layer is consumed and further material is needed from the same pallet. By virtue of swinging outwardly the abutments, the lifters are, with regard to their lifting motion, again freed, so that they can continue the lifting motion until the plate members separating the material layers or, as the case may be, the rockers, cooperate in the above-outlined manner with the abutment (by this time, of course, the abutments are already in their inwardly swung position) and the lifting motion is arrested.

It is of advantage to so design the inclined position of the pallet bottom that the material will lie against that pallet side which is positioned adjacent the conveyor in the withdrawal apparatus, since in this manner there will be no empty spaces in the path of transfer of the material onto the conveyor.

DESCRIPTION OF THE PREFERRED EMBODIMENT

It is noted at the outset that the system according to the invention is illustrated in all the figures only schematically, for the purpose of unencumbered visibility. Thus, many details which are shown in one figure, are omitted from others although they would also be visible there.

Figure 1:
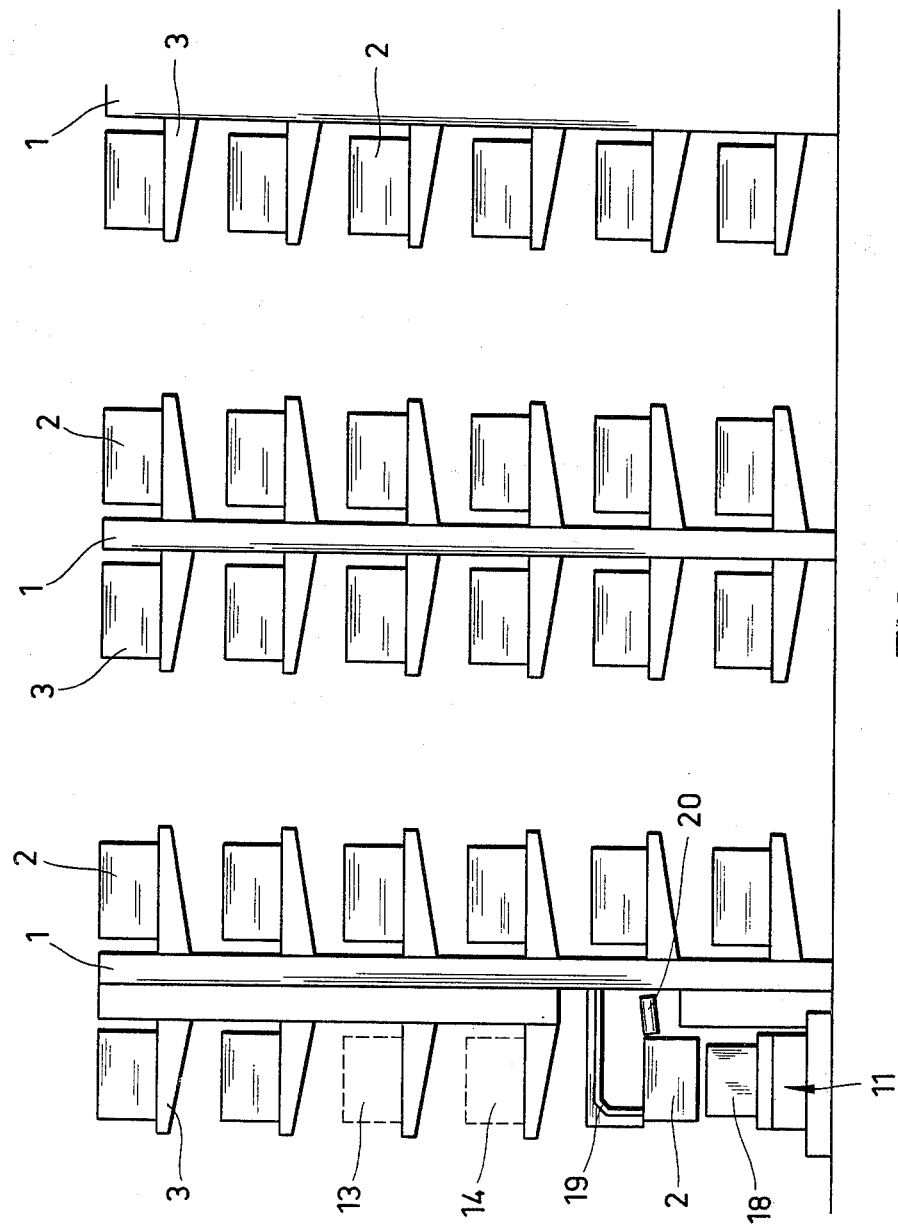
FIG. 1 is a schematic side elevational view of a system for the automatic supply of severing machines with rod-like material.
Figure 2:
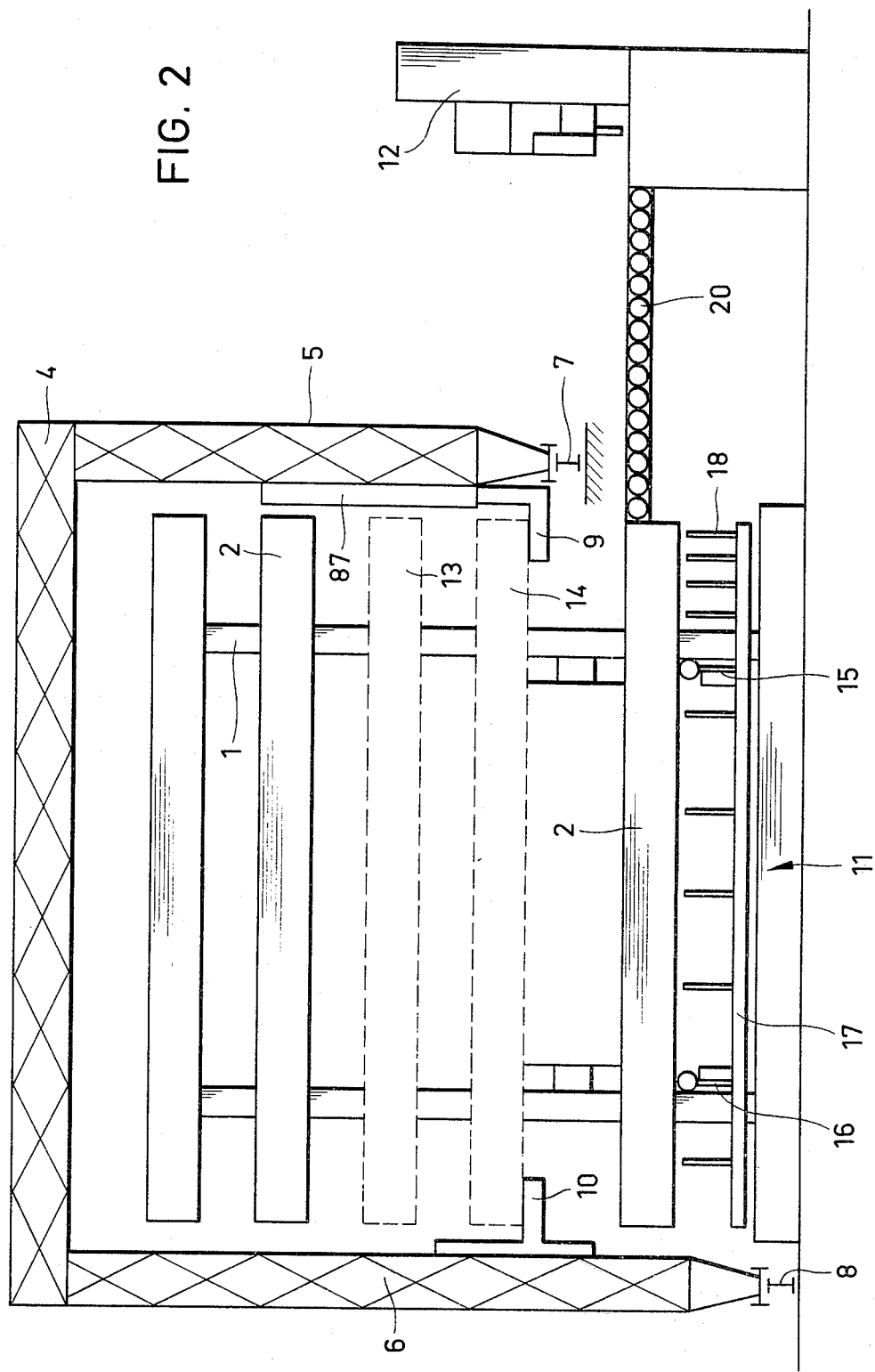
FIG. 2 is a schematic front elevational view of a system shown in FIG. 1.

According to FIGS. 1 and 2, the shelving units comprise vertical uprights 1 to which there are bilaterally secured arms 3 which serve as supporting bases for the pallets 2. The arms are oriented perpendicularly to the longitudinal dimension of the pallets 2. By virtue of the arrangement of the uprights 1 with respect to the pallets 2, as it may be seen in FIG. 2, it is ensured that the arms 3 are situated at a distance from the longitudinal end of the pallets 2.

Over the shelving units there may be moved a transport device which comprises a U-shaped frame 4, the vertical legs 5 and 6 of which are displaceably supported on horizontally extending rails 7 and 8, respectively, disposed adjacent opposite sides of the shelving units. In order to ensure that the transporting apparatus can be moved past the zone of the conveyor 20, the rail 7 is disposed at a distance above the conveyor 20 and the vertical leg 5 of the transport device is, accordingly, shorter than the vertical leg 6. Arms 9 and 10 extending horizontally and oriented in the longitudinal direction of the pallets 2, are vertically displaceably secured at each leg 5 and 6 and may be moved, for example, by means of telescoping cylinder-and-piston assemblies (not shown). It is to be understood that the shifting motions of the arms 9 and 10 are synchronized so that they are disposed at identical heights at all times. The arms 9 and 10 extend in such a manner in the zone of the pallet that they may be moved from the free space between the shelving unit under the pallet 2. In order to ensure that the arm 9 of the shorter U-leg 5 is able to reach the lower shelves of the shelving unit as well, its guide carriage 87 is accordingly extended into the direction of advance.

In order to deliver the pallet 2 to the removing device generally indicated at 11, the arms 9 and 10 are moved laterally out of the free space between the shelving units, under the free ends of the pallets 2. Thereafter the pallets 2 are lifted by the arm 3 and, with the aid of the transporting apparatus 4, are moved out of the free space between the shelving units. In the free space the pallets are then lifted beyond the uppermost pallets supported on the shelving units and subsequently, they are lowered adjacent the removing station 11 and are laterally introduced thereinto.

In order to maintain the period of standstill for the severing (sawing) machine 12 at the lowest possible value, it was found to be expedient to provide two free shelves 13 and 14 above the removing station 11. These two free shelves provide that while the severing machine 12 is still operating, the pallet 2 is, with the material next to be worked on, already brought into the shelf 13. Upon completion of work on the previous material, its pallet 2 is first brought from the removing apparatus 11 into the shelf 14 and the pallet which dwells in the shelf 13 is introduced into the removing apparatus 11. Now the severing machine 12 can already be supplied with new material and while the machine works on this new shipment, there is sufficient time available for the transporting apparatus 4 to return the pallet 2 dwelling in the shelf 14 to its storage location and to transport the pallet with the material to be worked on next, into the shelf 13.

The removing or withdrawal apparatus 11 includes essentially two supports 15 and 16 with which the respective pallets 2 can be lifted against stops of the withdrawal apparatus 11, a bridge member 17 with lifters 18 which pass through suitable bottom openings in the pallet 2 and can lift the material contained therein above the upper edge of the pallet and push members 19 which can transport the material lifted off of the pallet 2 onto the conveyor 20 which conveys it then to the cutting machine 12.

Figure 3:
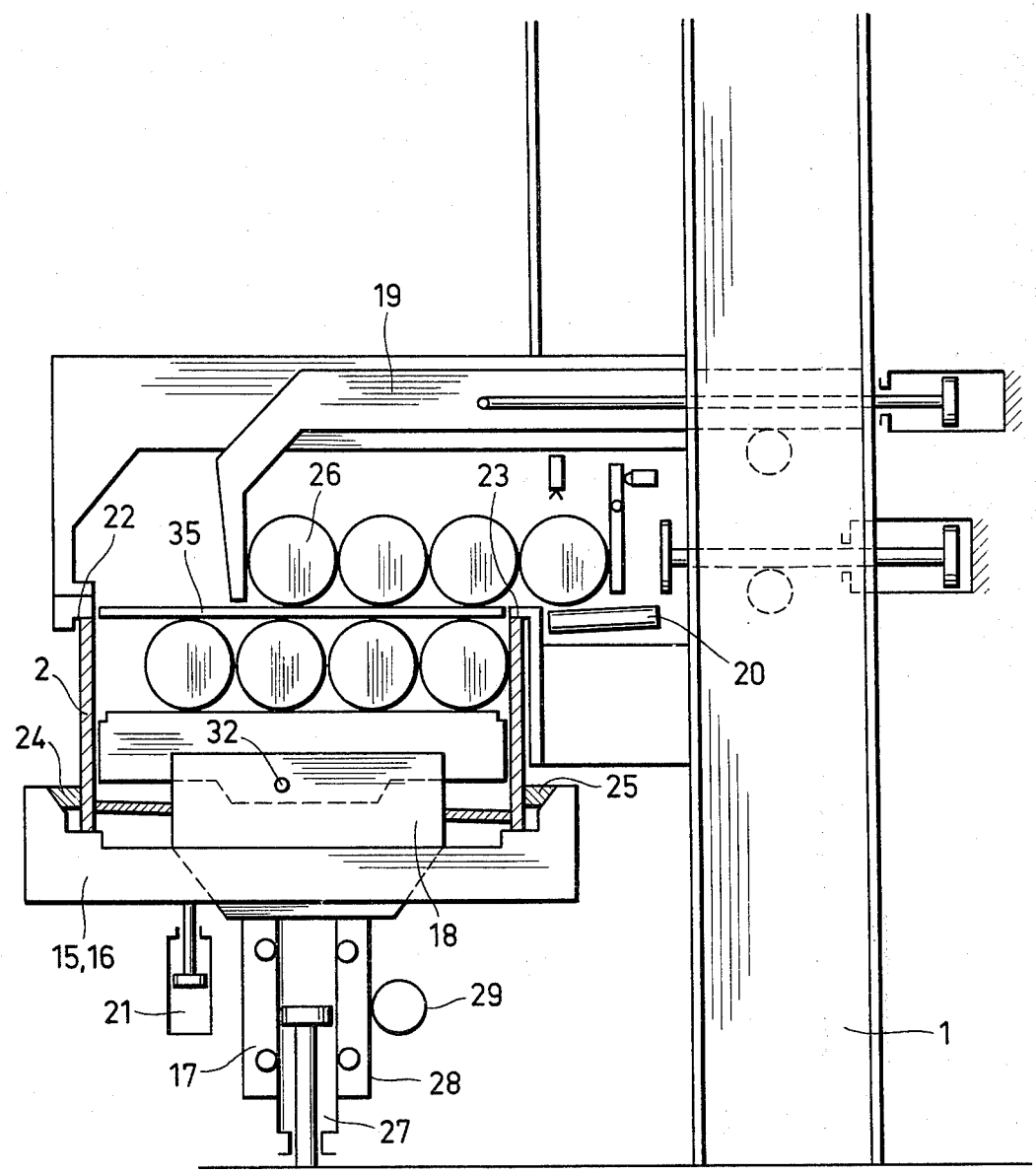
FIG. 3 is a sectional view of a preferred embodiment.

FIG. 3 illustrates further details of the withdrawal apparatus 11. Thus, each of the supports 15 and 16 is vertically displaceable by a cylinder-piston unit 21, so that each pallet 2 when set upon the support 15 and 16, can be lifted against abutments 22 and 23 of the withdrawing shelf. To ensure that the pallet 2 is properly oriented on the supports 15 and 16 in both the longitudinal and transversal directions, each pallet has at its sides and at the two end faces, chamfered projections 24 and 25, the slanted faces of which cooperate with the corresponding oblique faces of the supports 15 and 16. With regard to the non-illustrated projections associated with the end faces of the pallets, for the centering of the pallet in the longitudinal direction care has to be taken in connection with the cooperating oblique surfaces which may extend from the supports 15 and 16, that sufficient space is ensured for the arms 9 and 10 for lowering the pallets onto the supports 15 and 16.

Upon setting the pallet against the stops 22 and 23, there are released terminal contacts (not shown) which effect a shutoff of the pressure medium supply to the cylinder-piston unit 21. Thereafter the rods 26 may be lifted out. For this purpose there is provided the bridge 17 which is movable vertically by means of the cylinder-piston unit 27 and carries vertically oriented lifters 18 which may extend into the pallets 2 through openings provided in the bottom thereof. In order to ensure a synchronous motion generated by the cylinder-piston unit 27, the latter may move, for example, a toothed rack 28 which meshes with a pinion 29. The pinions 29 associated with the cylinder-piston unit 27 are supported on a common shaft.

Figure 4:
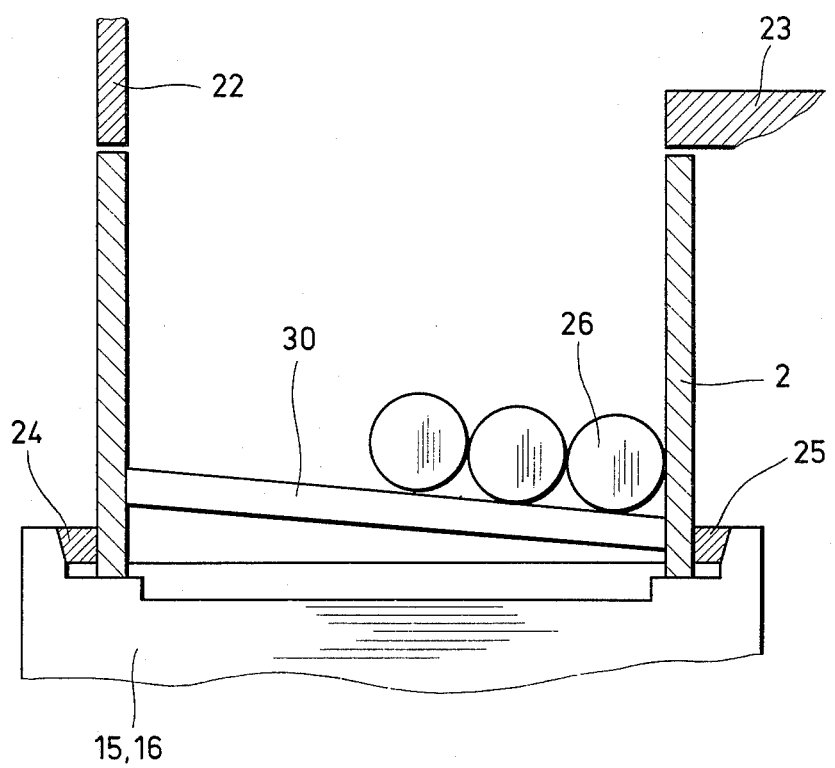
FIG. 4 is a sectional view, on an enlarged scale, of a detail of FIG. 3.

As it may be observed in FIGS. 3 and 4, the pallets 2 have a bottom 30 which inclines downwardly towards one longitudinal side of the pallet. This feature ensures that the material 26 is, in the pallet 2, always in a defined position in which it remains even in case of the normally appearing accelerations of the transporting apparatus 4, so that as the pallets are handled by the apparatus, the material therein is prevented from shifting back and forth. Further, the inclination of the bottom 30 is set in such a manner that the rods 26 cannot shift over one another. In this connection it is further expedient to so set the inclination of the bottom 30 that the rods 26 are situated at that longitudinal wall of the pallet 2 which will be adjacent the conveyor 20 in the withdrawal apparatus 11. It is desirable to maintain the rods 26 in their inclined position shown in FIG. 4 also during the lifting by the filter 18 so that the rods, even during this handling phase, cannot get out of control, and thus shift or roll back and forth. For this purpose, each lifter carries at its upper end a rocker 31 (also see FIG. 5) which is pivotally supported at 32 externally of its transversal middle, so that, under the weight of the rods 26, it tilts against a stop 33 and thus assumes an inclined position corresponding to that of the bottom 30 of the pallet 2.

At the end of the lifting operation, however, care should be taken that the rods are supported horizontally to ensure that they are brought without hindrance and without difficulties individually onto the conveyor 20. For this purpose, there are provided abutments 34 and 35 which the rockers 31 first engage with their higher side (the left side as observed in FIG. 5) whereby on the lifting motion there is superimposed a tilting motion of the rockers 31 until the latter also engage the stops 35. With this occurrence the lifting motion is terminated and simultaneously the rods 26 assume a horizontal orientation.

It is apparent that the stops 34 and 35 must not coincide with the abutments 22 and 23 but should be arranged at a proper location, that is, coordinated with the lifters 18, adjacent the abutments 22 and 23.

In case the rods 26 are arranged conventionally in several layers in the pallets 2, between the individual layers plate members 47 are inserted. A fragmentary top plan view of such a plate member is illustrated in FIG. 6. These plates cooperate, by means of their edges 36, with the abutments 34 and 35 in the same manner as it was described earlier in connection with the rocker 31. If now one rod layer is consumed and a further quantity of the same material is needed, the immediately underlying layer of rods has to be lifted out. In order to permit such an operation, the abutments 34 and 35, as it may be observed in FIG. 5, can be outwardly pivoted so that they free the rockers 31 or, as the case may be, the plate members 47 and thus a lifting operation may take place. While the latter is in progress, the abutments 34 and 35 are again pivoted inwardly so that the rockers 31 or, as the case may be, the plate members 47 can again cooperate with one another above the next layer.

Figure 5:
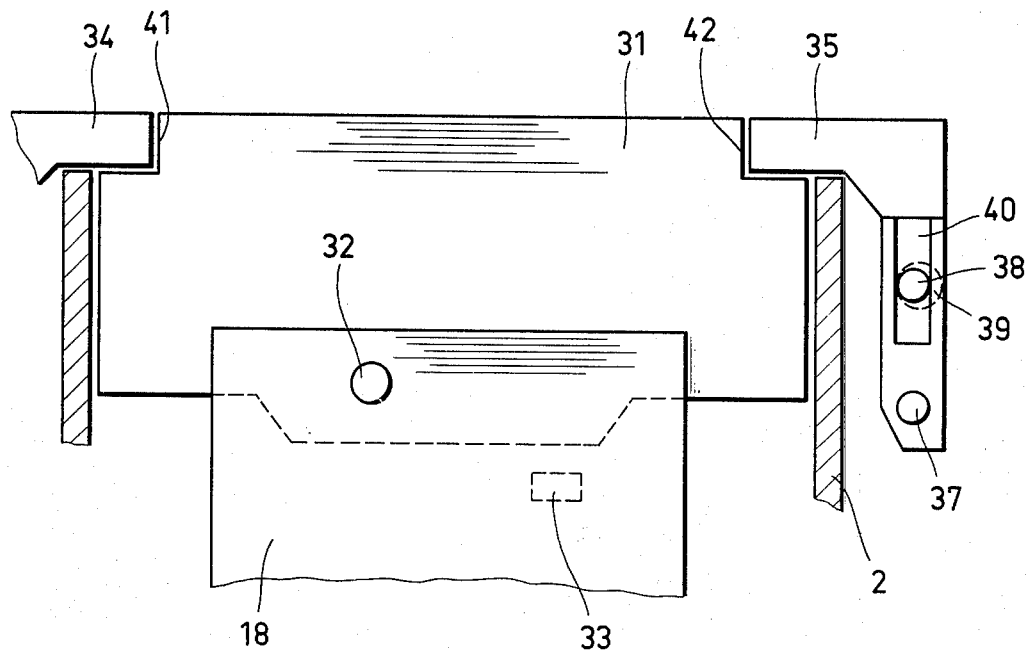
FIG. 5 is a sectional view, on an enlarged scale, of a further detail of FIG. 3.
Figure 6:
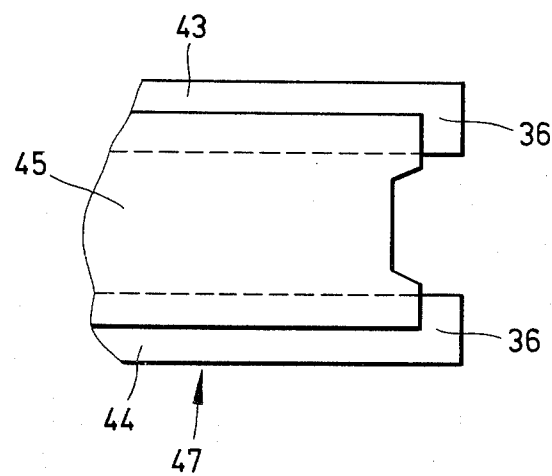
FIG. 6 is fragmentary top plan view of a plate member for separating the material layers.

In order to provide for a pivotal motion of the abutments 34 and 35, the latter, as illustrated in FIG. 5 only for the abutment 35, are rotatable about an axis 37 and their swinging motion will be effected by means of a pin 38 which is eccentrically secured to a shaft 39 or the like and extends into a vertical guiding groove 40 provided in the abutments 34 and 35. It is to be understood that the rotary motions of all the pins 38 are synchronized with one another.

In order to ensure that the manipulated layer of the rods 26 is, after completion of its lifting from the pallet, at a plane which is flush with the upper edges of the abutments 34 and 35, the rockers 31 are provided with cutouts 41 and 42. These cutouts match with the vertical cross section of the abutments 34 and 35 cooperating with the rockers, so that the upper edge of the rocker 31 can be aligned with the upper edges of the abutments 34 and 35. The same feature is accomplished also in case of the plate members 47 in a simple manner by designing them as two strips 43 and 44 which are connected by a common support sheet 45, as illustrated in FIG. 6. The rods 26 lifted out of the pallet 2 is brought in a conventional manner onto the conveyor 20 by means of the pushers 19. After the cutting of the material, the still usable remnants are shifted again onto the pallet 2 by means of the pushers 19. Thereafter, the lifters 18 again lower the rods 26 into the pallet. During this operation the material gradually assumes its inclined position corresponding to the inclination of the bottom 30 and then is deposited thereon.

In the embodiment illustrated in FIGS. 1 to 6 the removal or withdrawal apparatus 11 is arranged as a storage shelf. It is to be understood that the withdrawal apparatus can be provided laterally externally of the shelving unit rows between the latter and the cutting machine 12. In such an arrangement then the supports 15 and 16 as well the abutments adjusting the position of the pallets 2 may constitute a component of a carriage with which the pallet can be moved out of the shelving unit row and to the cutting machine 12, while the other components, particularly those illustrated in FIG. 3, constitute fixed parts of the externally located removal apparatus.

It will be understood that the above description of the present invention is susceptible to various modifications, changes and adaptations and the same are intended to be comprehended within the meaning and range of equivalents of the appended claims.

What is claimed is:

1. In a storage system for storing and retrieving rod-shaped material, including a plurality of pallets for accommodating material, each pallet having a material-supporting bottom; storing means for storing the pallets; withdrawal means for retrieving a selected one of the pallets from the storing means; positioning means in the withdrawal means for adjusting the longitudinal and transverse position of the pallet and for lifting the pallet against stops in the withdrawal means; an apparatus for lifting the material out of, and lowering it into a pallet disposed in the withdrawal means; the apparatus having at least two lifters arranged serially with respect to the length of the pallet disposed in the withdrawal means; means for moving the lifters in unison vertically through apertures provided in the bottom of the pallet for engaging and moving the material with respect to the pallet; abutment means projecting from a side of the pallet inwardly thereof for cooperating with the lifters to arrest their upward motion when the lifted material has reached, above the pallet, a predetermined position from which it is displaceable transversely to the length of the pallet onto a conveyor leading to a cutting machine; the improvement wherein each pallet bottom is inclined transversely to the length dimension of the pallet; further comprising a rocker pivotally attached to an upper end of each lifter; each rocker being arranged for a swinging motion about an axis extending parallel to the length of the pallet disposed in the withdrawal means; said axis being situated eccentrically with respect to the width of the pallet; in the direction of the higher-lying side of the pallet bottom; said abutment means including abutments situated on either side of said pallet disposed in said withdrawal means for cooperating with each rocker; said abutments having identical height positions.

2. A storage system as defined in claim 1, further comprising plate members disposed in the pallets for separating layers of the material from one another; each plate member in the pallet disposed in said withdrawal means being arranged in vertical alignment with said lifters and cooperating with said abutments.

3. A storage system as defined in claim 2, wherein each said abutment has a horizontal upper edge; each said plate member has an upper edge and means defining a cutout for accommodating the vertical cross-sectional outline of a cooperating portion of the associated abutment; said horizontal upper edge of each abutment being in alignment with said upper edge of said plate member when said abutments are in engagement with said plate member for arresting the upward motion of said lifters.

4. A storage system as defined in claim 1, wherein each said abutment has a horizontal upper edge; said rocker has an upper edge and means defining a cutout for accommodating the vertical cross-sectional outline of a cooperating portion of the associated abutment; said horizontal upper edge of each abutment being in alignment with said upper edge of the associated rocker when said abutments are in engagement with said rocker for arresting the upward motion of said lifters.

5. A storage system as defined in claim 1, further comprising an additional abutment affixed to each said rocker; said additional abutment cooperating with the associated rocker for determining the maximum inclined position thereof.

6. A storage system as defined in claim 1, further comprising means for pivotally supporting said abutments for swinging them out of a zone located within the outline of the pallet situated in said withdrawal means.

7. A storage systems as defined in claim 6, wherein said means for pivotally supporting said abutments including means defining a substantially vertically extending guiding slot provided in each of said abutments and an eccentrically and rotatably supported pin extending into said guiding slot of each said abutment.

* * * * *